United States Patent
Yoo et al.

(10) Patent No.: US 10,501,604 B2
(45) Date of Patent: Dec. 10, 2019

(54) POLYLACTIC ACID RESIN COMPOSITION

(71) Applicant: SK Chemicals Co., Ltd., Gyeonggi-do (KR)

(72) Inventors: Young-Man Yoo, Seoul (KR); Jae-il Chung, Gyeonggi-do (KR); Kye Yune Lee, Gyeonggi-do (KR); Sung-wan Jeon, Seoul (KR); Min-young Kim, Seoul (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/779,145

(22) PCT Filed: Apr. 2, 2014

(86) PCT No.: PCT/KR2014/002847
§ 371 (c)(1),
(2) Date: Sep. 22, 2015

(87) PCT Pub. No.: WO2014/163401
PCT Pub. Date: Oct. 9, 2014

(65) Prior Publication Data
US 2016/0053089 A1    Feb. 25, 2016

(30) Foreign Application Priority Data

Apr. 4, 2013 (KR) ........................ 10-2013-0037047

(51) Int. Cl.
| | |
|---|---|
| *C08G 63/08* | (2006.01) |
| *C08K 5/5393* | (2006.01) |
| *C08K 5/12* | (2006.01) |
| *C08K 5/36* | (2006.01) |
| *C08K 5/521* | (2006.01) |
| *C08L 67/02* | (2006.01) |
| *C08G 81/02* | (2006.01) |
| *C08K 5/00* | (2006.01) |
| *C08G 18/62* | (2006.01) |
| *C08J 5/18* | (2006.01) |

(52) U.S. Cl.
CPC ........ *C08K 5/5393* (2013.01); *C08G 18/6208* (2013.01); *C08G 63/08* (2013.01); *C08G 81/027* (2013.01); *C08K 5/005* (2013.01); *C08K 5/12* (2013.01); *C08K 5/36* (2013.01); *C08K 5/521* (2013.01); *C08L 67/02* (2013.01); *C08J 5/18* (2013.01); *C08J 2367/04* (2013.01)

(58) Field of Classification Search
CPC .................................................... C08G 63/08
See application file for complete search history.

(56) References Cited

U.S. PATENT DOCUMENTS

| | | |
|---|---|---|
| 2010/0093888 A1 | 4/2010 | Endo et al. |
| 2014/0154489 A1 | 6/2014 | Sohn et al. |
| 2014/0302297 A1 | 10/2014 | Yoo et al. |

FOREIGN PATENT DOCUMENTS

| | | |
|---|---|---|
| CN | 101899139 A | 12/2010 |
| JP | 2005281424 A * | 10/2005 |
| JP | 2012-001620 A | 1/2012 |
| KR | 10-2011-0049915 A | 5/2011 |
| KR | 10-2011-0067238 A | 6/2011 |
| KR | 10-2012-0068550 | 6/2012 |
| KR | 10-2012-0068552 | 6/2012 |
| KR | 10-2012-0086117 | 8/2012 |
| KR | 10-2012-0086118 | 8/2012 |
| KR | 10-2012-0094552 | 8/2012 |
| KR | 10-1191961 | 10/2012 |
| KR | 10-1191966 | 10/2012 |
| KR | 10-1191967 | 10/2012 |
| KR | 10-1191968 | 10/2012 |
| KR | 10-2012-0135889 A | 12/2012 |
| WO | WO 2010/027758 A1 | 3/2010 |

OTHER PUBLICATIONS

English machine translation of Yamada et al. (JP 2005-281424); translated Oct. 16, 2016.*
International Search Report and Written Opinion for corresponding International Application No. PCT/KR2014/002847, dated Jul. 17, 2014.
Office Action for Chinese Patent Application No. 201480020009.7 dated Aug. 5, 2016, 6 pages.
Office Action for Taiwanese Patent Application No. 103112538 dated Oct. 11, 2016, 6 pages.
Extended European Search Report for European Patent Application No. 14778230.4 dated Oct. 17, 2016, 4 pages.

* cited by examiner

*Primary Examiner* — Michael F Pepitone
(74) *Attorney, Agent, or Firm* — Alston & Bird LLP

(57) ABSTRACT

The present invention relates to a polylactic acid resin composition having eco-friendly properties, which can be effectively used as a packaging material due to improved flexibility and moisture resistance, as well as superior general properties such as mechanical properties, transparency, heat resistance, an anti-blocking property, and film processability.

The inventive polylactic acid resin composition comprises a polylactic acid resin comprising a hard segment comprising a polylactic acid repeating unit and a soft segment comprising a polyolefin-based polyol repeating unit in which polyolefin-based polyol structural units are linked in a linear or branched manner via a urethane bond or an ester bond, wherein the organic carbon content (% $C_{bio}$) of biomass-based carbon, as defined in Equation 1, is at least 60 wt %; and an antioxidant.

14 Claims, No Drawings

POLYLACTIC ACID RESIN COMPOSITION

CROSS-REFERENCE TO RELATED APPLICATIONS

The application is a national phase application of PCT/KR2014/002847, filed Apr. 2, 2001, which claims priority to Korean Patent Application No. 10-2013-0037047, filed Apr. 4, 2013.

FIELD OF THE INVENTION

The present invention relates to a polylactic acid resin composition. More specifically, the present invention relates to a polylactic acid resin composition having eco-friendly properties, which can be effectively used as a packaging material due to improved flexibility, and excellent general properties such as moisture resistance, mechanical properties, transparency, heat resistance, an anti-blocking property, and film processability.

BACKGROUND OF THE INVENTION

Petroleum-based resins such as polyethyleneterephthalate, nylon, polyolefin or plasticized polyvinyl chloride (PVC) are widely used today for a wide range of applications, for example, a packing material, and the like. However, such petroleum-based resins are not biodegradable, thereby causing environmental pollution, e.g., emission of a large amount of greenhouse gases during waste disposal processes, etc. Recently, due to gradual depletion of petroleum resources, use of biomass-based resins, typically polylactic acid resins, is widely considered as an alternative.

However, polylactic acid resins have unsatisfactory heat and moisture resistance or mechanical properties as compared with petroleum-based resins; thus, there have been limitations of the fields and applications to which they are applicable. Particularly, attempts have been made to use polylactic acid resins as packaging materials such as packaging films, but they have failed due to the poor flexibility of polylactic acid reins.

In order to overcome the problems of polylactic acid resins, it has been suggested that low-molecular weight flexibilizers or plasticizers be added to polylactic acid resins, or plasticizers produced by addition polymerization of polyether-based or aliphatic polyester-based polyol be applied to the polylactic acid resins, and the like.

However, there are few improvements in the flexibility of packaging films comprising polylactic acid resins, which have been produced according to these methods. Moreover, the packaging films exhibit poor stability as the plasticizers bleed out over time, and the films have disadvantages of an increase in haze as well as a decrease in transparency.

Further, a method of preparing block copolymers by introducing polyurethane polyol repeating units to polylactic acid resins has been suggested to redress the above problems (Korean Patent Nos. 1191966, 1191967, 1191968, and 1191961, and Korean Laid-Open Patent Publication Nos. 2012-0068552, 2012-0068550, 2012-0094552, 2012-0086118, and 2012-0086117).

Meanwhile, polylactic acid copolymers comprising a soft segment in which polyester polyol repeating units are linked via urethane bonds, or a resin composition or a film containing same have been already known. However, there are some problems that the film containing the polylactic acid copolymer has low transparency and high haze due to low compatibility between polyester polyol and polylactic acid, and has poor moisture resistance due to a high moisture content of polyester polyol and polylactic acid. Furthermore, since such polylactic acid copolymers have a wide molecular weight distribution and poor melting characteristics, they are not well extruded to prepare films. Also, the film thus produced has unsatisfactory mechanical properties, heat resistance, and anti-blocking property.

Generally, as described above, polylactic acid resins are very vulnerable to moisture due to a hydrolysis reaction caused by moisture contained therein. As a result of the reaction, the copolymer is in part degraded into lactic acid, monomers or oligomers, and thereby causing molecular weight degradation.

Moreover, lactic acid, monomers and oligomers thus produced are volatilized during a molding process, and may give rise to a contamination or corrosion of the equipment, or deteriorate the quality of finished products. Specifically, in case of a sheet production via extrusion molding, the residual lactic acid, monomers, and oligomers are volatilized during the sheet extrusion process, thereby causing variations in thickness. In case of a sheet production via injection molding, a hydrolysis reaction continuously takes place even after the manufacturing process has been completed, depending on the environment in which the product is used, thereby causing deterioration in its mechanical properties.

Accordingly, there is a continuous demand for a polylactic acid resin composition having improved flexibility and good moisture resistance, as well as superior general properties such as mechanical properties, transparency, heat resistance, an anti-blocking property, or bleedout resistance, which can be effectively used as a polylactic acid resin-based packaging material.

SUMMARY OF THE INVENTION

Therefore, it is an object of the present invention to provide a polylactic acid resin composition having eco-friendly properties, which can be effectively used as a packaging material due to improved flexibility, as well as superior general properties thereof, such as moisture resistance, mechanical properties, transparency, heat resistance, an anti-blocking property, and film processability.

In accordance with one aspect of the present invention, there is provided a polylactic acid resin composition, comprising:

a polylactic acid resin comprising a hard segment comprising a polylactic acid repeating unit of Formula 1 and a soft segment comprising a polyolefin-based polyol repeating unit in which polyolefin-based polyol structural units of Formula 2 are linked in a linear or branched manner via a urethane bond or an ester bond, wherein the organic carbon content (% $C_{bio}$) of biomass-based carbon, as defined in Equation 1, is at least 60 wt %, wherein, in Formulae 1 and 2, n is an integer from 700 to 5,000, and m+1 is an integer from 5 to 200; and an antioxidant:

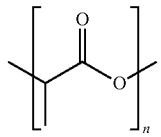

[Formula 1]

-continued

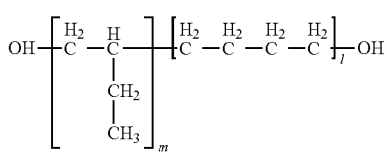
[Formula 2]

% $C_{bio}$=(weight ratio of $^{14}C$ isotope to $^{12}C$ of the total carbon content in the polylactic acid resin)/(weight ratio of $^{14}C$ isotope to $^{12}C$ of the total carbon content in a biomass-based carbon standard material). [Equation 1]

The polylactic acid resin composition according to the present invention not only exhibits characteristics that are unique to polylactic acid resins such as eco-friendly properties and biodegradability, but also has optimized flexibility, moisture resistance, and stiffness as well as superior mechanical properties, heat resistance, transparency, an antiblocking property, and film processability. The polylactic acid resin composition can be used in preparing a packaging material, e.g., a packaging film, to substitute petroleum-based resins, thereby contributing greatly to the prevention of environmental pollution.

DETAILED DESCRIPTION OF THE INVENTION

Hereinafter, a polylactic acid resin composition according to one embodiment of the present invention is explained in detail.

A polylactic acid resin composition of the present invention comprises a polylactic acid resin and an antioxidant. The polylactic acid resin comprises a hard segment comprising a polylactic acid repeating unit of Formula 1 and a soft segment comprising a polyolefin-based polyol repeating unit in which polyolefin-based polyol structural units of Formula 2 are linked in a linear or branched manner via a urethane bond or an ester bond, wherein the organic carbon content (% $C_{bio}$) of biomass-based carbon, as defined in Equation 1, is at least 60 wt %, wherein, in Formulae 1 and 2, n is an integer from 700 to 5,000, and m+1 is an integer from 5 to 200.

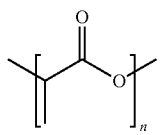
[Formula 1]

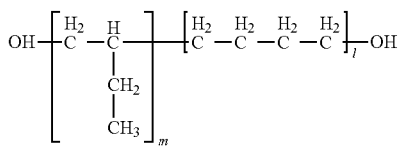
[Formula 2]

% $C_{bio}$=(weight ratio of $^{14}C$ isotope to $^{12}C$ of the total carbon content in the polylactic acid resin)/(weight ratio of $^{14}C$ isotope to $^{12}C$ of the total carbon content in a biomass-based carbon standard material). [Equation 1]

The polylactic acid resin composition comprises specific amounts of a polylactic acid resin and an antioxidant. The polylactic acid resin basically comprises a polylactic acid repeating unit represented by Formula 1 as a hard segment. Also, the polylactic acid comprises a polyolefin-based polyol repeating unit as a soft segment. In such polyolefin-based polyol repeating unit, polyolefin-based polyol structural units represented by Formula 2 are linked in a linear or branched manner via a urethane bond (—C(=O)—NH—) or an ester bond (—C(=O)—O—).

The polylactic acid resin exhibits such characteristics as eco-friendly properties and biodegradability, which are unique to biomass-based resins, owing to the presence of the polylactic acid repeating unit as a hard segment. In addition, according to experiment data obtained by the present inventors, it was confirmed that the polylactic acid resin shows improved flexibility (e.g., a relatively low total Young's modulus measured in the machine direction and the transverse direction), and allows the production of a film with high transparency and low haze due to the polyolefin-based polyol repeating unit serving as a soft segment. Particularly, due to the presence of the hard segment and the soft segment in combination, the polylactic acid resin lowers the possibilities of reduction in stability or bleed-out of the soft segment, which is responsible for the flexibility. A film comprising the polylactic acid resin is less likely to suffer from high haze or low transparency. Also, the polylactic acid resin can exhibit the aforementioned benefits without employing a large amount of the soft segment, which is responsible for the flexibility; thus, it can contain a relatively large amount of a biomass-based resin, for example, a hard segment derived from a polylactic acid resin.

Meanwhile, the polylactic acid resin comprises a nonpolar soft segment and thus has excellent moisture resistance as compared to conventional polylactic acid resins.

In the polylactic acid resin contained in the polylactic acid resin composition, the organic carbon content (% $C_{bio}$) of biomass-based carbon, as defined in Equation 1, thereof may be at least about 60 wt %, at least about 70 wt %, at least about 80 wt %, at least about 85 wt %, at least about 90 wt %, or at least about 95 wt %.

As compared to the polylactic acid resin composition of the present invention, which employs polyolefin-based polyol repeating units, it may be difficult to obtain an organic carbon content (% $C_{bio}$) of about 60 wt % when a polyester-based repeating unit is employed as a soft segment, because it is necessary to employ a large amount of other resins such as a polyester-based polyol repeating unit derived from a petroleum-based resource.

Measurement of the organic carbon content (% $C_{bio}$) of biomass-based carbon as represented in Equation 1 can be performed through standard test methods according to, e.g., the ASTM D6866 standard. Hereinafter, the technological significance and measurement method of the organic carbon content (% $C_{bio}$) of biomass-based carbon are explained in detail.

Generally, unlike organic materials derived from petroleum-based resins, organic materials derived from biomass-based (or living resource-based) resins are known to contain $^{14}C$ isotopes therein. More specifically, all organic materials taken from living organisms such as animals or plants contain three isotopes in a constant proportion: $^{12}C$ (approximately 98.892 wt %), $^{13}C$ (approximately 1.108 wt %), and $^{14}C$ (approximately $1.2 \times 10^{-10}$ wt %). This ratio is identical to that of the atmosphere, which is kept constant because carbon is continually exchanged with the environment by metabolism in living organisms.

Meanwhile, $^{14}C$ is a radioactive isotope, and the amount thereof decreases over time (t) according to Equation 2 below:

$$n = no \cdot \exp(-at)$$ [Equation 2]

wherein, no is the number of $^{14}C$ atoms at the initial stage, n is the number of $^{14}C$ atoms remaining after time t, and a is the decay constant (or radioactivity decay constant), which is related to the half-life.

In Equation 2, the half-life of $^{14}C$ is approximately 5,730 years. Considering such half-life, organic materials derived from living organisms that continuously interact with their surrounding environment, i.e., biomass-based (living resource-based) resins, can substantially maintain a constant $^{14}C$ amount and a constant content ratio of the isotopes, for example, a constant content ratio (weight ratio) of $^{14}C/^{12}C$=about $1.2 \times 10^{-12}$, despite a slight reduction in the isotopes content.

In comparison, fossil fuels such as coal or petroleum were unable to exchange carbon atoms with the atmosphere for at least 50,000 years. According to Equation 2 above, the $^{14}C$ isotope content of organic materials derived from fossil fuel-based resins is at most 0.2% of the initial content; thus such materials contain substantially no $^{14}C$ isotope.

Equation 1 is based on the technological significance as described above. In Equation 1, the denominator may be the weight ratio of $^{14}C/^{12}C$ in a biomass-based carbon, e.g., about $1.2 \times 10^{-12}$, and the numerator may be the weight ratio of $^{14}C/^{12}C$ in a resin sample. As explained above, based on the fact that the weight ratio of carbon atoms isotopes derived from a biomass is maintain at about $1.2 \times 10^{\times 12}$, whereas the weight ratio of carbon atom isotopes derived from fossil fuels is substantially 0, the organic carbon content (% $C_{bio}$) of biomass-based carbon can be measured from a polylactic acid resin contained in a polylactic acid resin composition by using Equation 1. The content of each carbon isotope and a ratio thereof may be measured by one of the methods described in Standard ASTM D6866-06 (Standard Test Methods for Determining the Biobased Content of Natural Range Materials Using Radiocarbon and Isotope Ratio Mass Spectrometry Analysis). Preferably, measurements may be carried out by mass spectrometry in which a resin sample is reduced to graphite or carbon dioxide gas, and then analyzed in a mass spectrometer or by liquid scintillation spectrometry. In the mass spectrometry technique, an accelerator and a mass spectrometer are used to separate $^{14}C$ ions from $^{12}C$ ions to measure the content of each carbon isotope and a ratio thereof. Optionally, those skilled in the art may use liquid scintillation spectrometry to measure the content of each carbon isotope and a ratio thereof to calculate the value in Equation 1.

When the organic carbon content (% $C_{bio}$) of biomass-based carbon measured in Equation 1 is at least about 60 wt %, a polylactic acid resin and a polylactic acid resin composition comprising same can contain larger amount of biomass-based resin and carbon, thereby allowing enhanced eco-friendly properties and biodegradability.

More specifically, a polylactic acid resin and a polylactic acid resin composition comprising same with such high organic carbon content (% $C_{bio}$) can exhibit eco-friendly properties as explained below.

Biochemical products such as polylactic acid resins are biodegradable and release less amounts of carbon dioxide; according to the present level of technology, the amount of carbon dioxide released can be reduced by up to 108%, and the energy required for manufacturing resins can be saved by up to 50% as compared to petrochemical products. Additionally, when a biomass material, instead of fossil fuels, is used for manufacturing a bioplastic, the amount of $CO_2$ emission calculated by the ISO 14000 compliant Life Cycle Analysis (LCA, procedures of life cycle assessment) can be reduced by up to about 70%.

As a specific example, according to NatureWorks, 3.4 kg of $CO_2$ was released when 1 kg of a PET resin was produced, whereas 0.77 kg of $CO_2$ was released per 1 kg of a polylactic acid resin, i.e., a bioplastic, which shows approximately 77% reduction of $CO_2$. Also, in terms of energy consumption, such bioplastic required only 56% of energy as compared with the energy consumption for PET. However, conventional polylactic acid resins had limitations due to low flexibility, and it was observed that the advantages of a bioplastic as described above would significantly be impaired when other ingredients such as a plasticizer are employed to redress said problem.

However, a polylactic acid resin and a polylactic acid resin composition comprising same, which satisfy the high organic carbon content (% $C_{bio}$) as described above, can exhibit the advantages of a bioplastic and can be used in various applications because the low flexibility problem of a polylactic acid resin is resolved.

Accordingly, a polylactic acid resin and a polylactic acid resin composition comprising same, which satisfy the high organic carbon content (% $C_{bio}$) as described above, have the advantages of a bioplastic and thus can exhibit eco-friendly properties by significantly reducing $CO_2$ emission and energy consumption. Such eco-friendly properties can be measured by, for example, life cycle assessment of a polylactic acid resin composition and the like.

In the polylactic acid resin composition, the polylactic acid resin may comprise $^{14}C$ isotope in an amount of about $7.2 \times 10^{-11}$ to $1.2 \times 10^{-10}$ wt %, about $9.6 \times 10^{-11}$ to $1.2 \times 10^{-10}$ wt %, or about $1.08 \times 10^{-10}$ to $1.2 \times 10^{-10}$ wt %. The polylactic acid resin comprising said amount of $^{14}C$ isotope may have larger amounts of resin and carbon, or substantially entire resin and carbon, derived from biomass, thereby exhibiting more improved biodegradability and eco-friendly properties.

In the polylactic acid resin, the polylactic acid repeating unit of a hard segment may be derived from a biomass, and the polyolefin-based polyol structural unit of a soft segment may be derived from a biomass as well. Such polylactic acid structural unit may be, for example, obtained from a polyolefin-based polyol resin, which is derived from a biomass. The biomass may be any plant or animal resource, e.g., a plant resource such as corn, sugar cane or tapioca. As such, the polylactic acid resin comprising the polyolefin-based polyol structural unit derived from a biomass and the polylactic acid resin composition comprising same may contain a larger amount of organic carbon content (% $C_{bio}$), e.g., at least about 90 wt % or at least about 95 wt %.

In the polylactic acid resin, the hard segment derived from a biomass has an organic carbon content (% $C_{bio}$), as defined in Equation 1, of at least about 90 wt %, preferably about 95 to 100 wt %; and the soft segment derived from a biomass has an organic carbon content (% $C_{bio}$), as defined in Equation 1, of at least about 70 wt %, preferably about 75 to 95 wt %.

The resin composition comprising the biomass-based polylactic acid resin has the high organic carbon content (% $C_{bio}$) of biomass-based carbon of at least about 60 wt %, or at least about 80 wt %, thereby meeting the criteria for obtaining the "Biomass Pla" certification of the JBPA, a certification based on Standard ASTM D6866. Therefore, the polylactic acid resin can validly carry the "Biomass-based" label of the JORA.

In the polylactic acid resin, the polylactic acid repeating unit of Formula 1 included in the hard segment may refer to a polylactic acid homopolymer or a repeating unit of the homopolymer. Such polylactic acid repeating unit may be obtained according to conventional methods for preparing a polylactic acid is homopolymer well known in the art. For example, it can be obtained by a method of forming an L- or D-lactide, i.e., a cyclic dimer, from L- or D-lactic acid and carrying out a ring-opening polymerization, or by a method of direct polycondensation of L- or D-lactic acid. Among them, the ring-opening polymerization method is preferable because it can provide the polylactic acid repeating unit in a higher degree of polymerization. Also, the polylactic acid repeating unit may be prepared by copolymerizing L-lactide and D-lactide at a certain ratio so as to make the copolymer non-crystalline, but the polylactic acid repeating unit is preferably prepared by homopolymerization of either L-lactide or D-lactide in order to increase the heat resistance of a film comprising the polylactic acid resin. More specifically, an L- or D-lactide material with optical purity of at least 98% may be subjected to ring-opening polymerization to obtain the polylactic acid repeating unit. A lower optical purity may lower the melting temperature (Tm) of the polylactic acid resin.

Meanwhile, the polyolefin-based polyol repeating unit included in the soft segment of the polylactic acid resin has a structure in which the polyolefin-based polyol structural units of Formula 2 are linked in a linear or branched manner via a urethane bond (—C(=O)—NH—) or an ester bond (—C(=O)—O—). Specifically, the polyolefin-based polyol structural unit may refer to a polymer (e.g., poly 1,2-butadiene or poly 1,3-butadiene) prepared from monomers such as butadiene, or a structural unit of the polymer, a liquid-phase hydroxyl-terminated polybutadiene (HTPB) with a number average molecular weight of 1,000 to 5,000 prepared from a hydrogenation reaction, which may have a hydroxyl group at its terminal end.

The terminal hydroxyl group of the polyolefin-based polyol structural unit or a prepolymer prepared by addition polymerization between the terminal hydroxyl group of the polyolefin-based polyol structural unit and lactide may react with diisocyanate or di- or higher functional isocyanate compounds to form a urethane bond. Meanwhile, the terminal hydroxyl group of the polyolefin-based polyol structural unit may react with lactide or a lactic acid derivative compound to form an ester bond (—C(=O)—O—). The polyolefin-based polyol structural units are linked in a linear or branched manner via such urethane or ester bond to form the polyolefin-based polyol repeating unit.

The molar ratio of the terminal hydroxyl group of the polyolefin-based polyol structural unit to the isocyanate group of diisocyanate or di- or higher functional isocyanate compound may be 1:0.50 to 1:0.99. Preferably, the molar ratio of the terminal hydroxyl group of the polyolefin-based polyol structural unit:the isocyanate group of isocyanate compound may be about 1:0.60 to about 1:0.95, more preferably, about 1:0.70 to about 1:0.90.

A polymer in which the polyolefin-based polyol structural units are linearly linked via a urethane bond, or a repeating unit of the polymer, may be referred to as a polyurethane polyol repeating unit and may have a hydroxyl group at its terminal. Accordingly, the polyolefin-based polyol repeating unit may act as an initiator for the formation of the polylactic acid repeating unit in the polymerization process. When the molar ratio of the terminal hydroxyl group:isocyanate group is 0.99 or less, the number of terminal hydroxyl groups of the polyurethane polyol repeating unit is not insufficient (OHV<1); thus, it can suitably act as an initiator. Also, when the molar ratio of the hydroxyl group:the isocyanate group is 0.50 or greater, it prevents the terminal hydroxyl group of the polyolefin-based polyol repeating unit from being too excessive (OHV>35); thus, it is possible to obtain polylactic acid repeating units and polylactic acid resins with high molecular weights.

The polymer having the polyolefin-based polyol repeating unit may have a number average molecular weight of about 1,000 to 100,000, preferably about 10,000 to 50,000. When the number average molecular weight of the polymer having the polyolefin-based polyol repeating unit is about 1,000 to 100,000, the polylactic resin and a film prepared from the resin composition comprising same exhibit improved flexibility, moisture resistance, and mechanical properties.

The diisocyanate compound may be any compound that has at least two isocyanate groups, so long as it can form a urethane bond with the terminal hydroxyl group of the polyolefin-based polyol repeating unit: it may be derived from fossil fuels.

Examples of the diisocyanate compounds include 1,6-hexamethylene diisocyanate, 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-bisphenylene diisocyanate, hexamethylene diisocyanate, isophorone diisocyanate, and hydrogenated diphenylmethane diisocyanate. Multifunctional isocyanate compounds with at least three isocyanate functional groups may be selected from the group consisting of an oligomer of the diisocyanate compounds, a polymer of the diisocyanate compounds, a ring type multimer of the diisocyanate compounds, a hexamethylene diisocyanate isocyanurate, a triisocyanate compound, and an isomer thereof. In addition, various other diisocyanate compounds well known to those who skilled in the art may be used without particular limitations. Considering the ability to endow the polylactic acid resin with flexibility, 1,6-hexamethylene diisocyanate is preferred.

Meanwhile, the polylactic acid resin included in the composition may comprise a block copolymer in which the terminal carboxyl group of said polylactic acid repeating units contained in the hard segment is linked to the terminal hydroxyl group of said polyolefin-based polyol structural units contained in the soft segment via an ester bond, or a block copolymer in which the block copolymers are linked in a linear or branched manner via a urethane bond.

Specifically, the terminal carboxyl group of said polylactic acid repeating unit can be linked to the terminal hydroxyl group of polyurethane polyol repeating unit via an ester bond in the block copolymer. For example, the chemical structure of the block copolymer may be represented by the following General Formulae 1 and 2:

Polylactic acid repeating unit(L)-(E)-polyolefin-based polyol repeating unit(O-U-O-U-O)-(E)-polylactic acid repeating unit(L)  [General Formula 1]

Polylactic acid repeating unit(L)-(E)-polyolefin-based polyol structural unit(O)-(E)-polylactic acid repeating unit(L)-(U)-polylactic acid repeating unit(L)-(E)-polyolefin-based polyol structural unit(O)-(E)-polylactic acid repeating unit(L),  [General Formula 2]

wherein, O refers to the polyolefin-based polyol structural unit, U refers to a urethane bond, and E refers to an ester bond.

Since the polylactic acid resin comprises a block copolymer in which the polylactic acid repeating unit and the polyolefin-based polyol structural or repeating unit are linked together, it suppresses the bleed-out of the polyolefin-based polyol structural or repeating unit, which is responsible for the flexibility. Accordingly, the film produced therefrom can have excellent moisture resistance, transparency, mechanical properties, heat resistance or anti-blocking property. In addition, since at least some of polylactic acid structural or repeating units and the polyolefin-based polyol repeating units have a form of a block copolymer, molecular weight distribution, glass transition temperature (Tg), and melting temperature (Tm) of the polylactic acid resin can be optimized, and mechanical properties, flexibility, heat resistance, etc. of the film produced therefrom can be improved.

However, it is not necessary for all the polylactic acid repeating units included in the polylactic acid resin are linked to the polyolefin-based polyol structural or repeating units to form a block copolymer. At least some of the polylactic acid repeating units may be a polylactic acid homopolymer, which does not bond to the polyolefin-based polyol structural or repeating units. In this case, the polylactic acid resin may be a mixture comprising: a block copolymer in which the terminal carboxyl group of the polylactic acid repeating unit contained in the hard segment is linked to the terminal hydroxyl group of the polyolefin-based polyol structural unit contained in the soft segment via an ester bond, a block copolymer prepared by linking said block copolymers in a linear or branched manner via a urethane bond, and for a polylactic acid homopolymer which remains uncoupled with the polyolefin-based polyol repeating unit.

Meanwhile, the polylactic acid resin may comprise the hard segment in an amount of about 65 to 95 parts by weight, about 80 to 95 parts by weight, or about 82 to 92 parts by weight; and the soft segment in an amount of about 5 to 35 parts by weight, about 5 to 20 parts by weight, or about 8 to 18 parts by weight based on 100 parts by weight of the total polylactic acid resin (when the polylactic acid homopolymer is optionally included, 100 parts by weight is the sum of the weight of the block copolymer and the homopolymer).

If the content of the soft segment is 95 parts by weight or less, a polylactic acid resin with a high molecular weight can be provided, and the mechanical properties thereof, e.g., strength of the film, etc., may be enhanced. In addition, slipping property, workability or dimensional stability of the film during the packaging process may be improved because the glass transition temperature of the film is not lowered. Also, if the content of the soft segment is 35 parts by weight or greater, the flexibility and moisture resistance of the polylactic acid resin and the film prepared therefrom may be improved. Particularly, the glass transition temperature of the polylactic acid resin is appropriate, and thus, the flexibility of the film may be improved. Also, the polyolefin-based polyol structural or repeating unit of the soft segment may function as an initiator, thereby preventing the decrease of the polymerization conversion rate and allowing the formation of a polylactic acid resin having a high molecular weight.

Meanwhile, the polylactic acid resin composition comprises the polylactic acid resin together with an antioxidant. The antioxidant can suppress a yellowing of the polylactic acid resin, thereby improving the appearance of the resin composition and the film. Further, the antioxidant may suppress the oxidation or thermal degradation of the soft segment.

For this purpose, the polylactic acid resin composition may comprise the antioxidant in an amount of about 100 to 3,000 ppmw, about 100 to 2,000 ppmw, about 500 to 1,500 ppmw, or about 1,000 to 1,500 ppmw, based on the amount of the monomers (for example, lactic acid or lactide) for forming the polylactic acid repeating unit of the polylactic acid resin.

When the content of the antioxidant is 100 ppmw or greater, a yellowing of the polylactic acid resin, which is caused by the oxidation of a flexibilizing ingredient such as the soft segment, can be prevented and the appearance of the resin composition and the film may be good. Also, when the content of the antioxidant is 3,000 ppmw or less, the polymerization rate of lactide maintains appropriate and the antioxidant contribute to the generation of the hard segment comprising the polylactic acid repeating unit. As a result, the mechanical properties of the polylactic acid resin may be improved.

In case where the antioxidant is comprised in an amount mentioned above (for example, in case where the polylactic acid resin and the resin composition is prepared by adding the antioxidant in an amount mentioned above during the polymerization of the polylactic acid resin), the conversion of polymerization and the degree of polymerization of the polylactic acid resin can be improved to increase the productivity. Moreover, since the resin composition can exhibit superior heat stability in the film forming process over 180° C., it suppresses the formation of monomers such as lactide or lactic acid, or low molecular weight materials having a cyclic oligomer chain.

Therefore, it is possible to provide a packaging film which has not only superior appearance but also improved flexibility as well as general properties such as mechanical properties, heat resistance, anti-blocking property, and the like, as a result of suppressing a decrease in the molecular weight of the polylactic acid resin and the color change (yellowing) of the film.

As for the antioxidant, one or more antioxidants selected from the group consisting of a hindered phenol-based antioxidant, an amine-based antioxidant, a thio-based antioxidant, and a phosphite-based antioxidant may be used, and other various known antioxidants applicable to a polylactic acid resin composition may also be used.

Since the polylactic acid resin composition may have an ester repeating unit, the resin composition tends to be easily oxidized or thermal-degraded during a high temperature polymerization reaction or high temperature extrusion or figuration process. Therefore, it is preferable to use the above-described thermal stabilizers, polymerization stabilizers or antioxidants. Specific examples of the antioxidant include phosphoric acid-based thermal stabilizers such as phosphoric acid, trimethyl phosphate, or triethyl phosphate; hindered phenol-based primary antioxidants such as 2,6-di-t-butyl-p-cresol, octadecyl-3-(4-hydroxy-3,5-di-t-butylphenyl)propionate, tetrabis[methylene-3-(3,5-di-t-butyl-4-hydroxyphenyl)propionate]methane, 1,3,5-trimethy1-2,4,6-tris(3,5-di-t-butyl-hydroxybenzyl)benzene, 3,5-di-t-butyl-4-hydroxybenzylphosphite diethyl ester, 4,4'-butylidene-bis(3-methyl-6-t-butylphenol), 4,4'-thiobis(3-methyl-6-t-butylphenol) or bis[3,3-bis-(4'-hydroxy-3'-tert-butylphenyl)butanoic acid]glycol ester; amine-based secondary antioxidants such as phenyl-α-naphthylamine, phenyl-(β-naphthyl amine, N, N'-diphenyl-p-phenylene diamine or N, N'-di-β-naphthyl-p-phenylene diamine; thio-based secondary antioxidants such as dilauryl disulfide, dilauryl thiopropionate, distearyl thiopropionate, mercaptobenzothiazole or tetramethylthiuram disulfide tetrabis[methylene-3-(lauryl-thio)propionate]methane; or phosphite-based secondary antioxidants such as triphenyl phosphite, tris(nonylphenyl) phosphite, triisodecyl phosphite, bis(2,4-di-t-butylphenyl) pentaerythritol diphosphite or (1,1'-biphenyl)-4,4'-diylbisphosphonous acid tetrakis[2,4-bis(1,1-dimethylethyl) phenyl]ester. Among them, it is most preferable to use a phosphite-based antioxidant in combination with other antioxidant.

In addition to the antioxidant described above, the polylactic acid resin composition may comprise various additives, such as a plasticizer, a UV stabilizer, a color blocking agent, an anti-gloss agent, a deodorant, a flame retardant, an anti-weathering agent, an anti-static agent, a releasing agent, an ion exchanger, a coloring pigment, and inorganic or organic particles.

The examples of the plasticizer include phthalic acid ester-based plasticizers, such as phthalic acid diethyl, phthalic acid dioctyl, and phthalic acid dicyclohexyl; aliphatic dibasic acid ester-based plasticizers, such as adipic acid di-1-butyl, adipic acid di-n-octyl, sebacic acid di-n-butyl, and azelaic acid di-2-ethyl hexyl; phosphoric acid ester-based plasticizers, such as phosphoric acid diphenyl-2-ethyl hexyl and phosphoric acid diphenyl octyl; polyhydroxy carbonic acid ester-based plasticizers, such as acetyl citric acid tributyl, acetyl citric acid tri-2-ethyl hexyl, and citric acid tributyl; fatty acid ester-based plasticizers, such as acetyl ricinoleic acid methyl, and stearic acid amyl; polyhydric alcohol ester-based plasticizers such as glycerin triacetate; and epoxy-based plasticizers, such as epoxylated soybean oil, epoxylated flaxseed oil fatty acid butyl ester, and epoxylated stearic acid octyl. Also, examples of the coloring pigments may include inorganic pigments such as carbon black, titanium oxide, zinc oxide, and iron oxide; and organic pigments such as cyanines, phosphorous, quinones, perinones, isoindolinones, and thioindigos. Inorganic or organic particles may be used to improve the anti-blocking property of a film, and examples thereof may include silica, colloidal silica, alumina, alumina sol, talc, mica, calcium carbonate, polystyrene, poly methyl methacrylate, and silicon. Further, various additives applicable to polylactic acid resins or films may be employed.

The polylactic acid resin in the resin composition may have a number average molecular weight of about 50,000 to 200,000, preferably about 50,000 to 150,000. Also, the polylactic acid resin may have a weight average molecular weight of about 100,000 to 400,000, preferably about 100,000 to 320,000. The molecular weights may influence processability of the resin composition and mechanical properties of the film. When the molecular weight is 50,000 or greater, the melt viscosity of the resin is suitable during a melting process such as extrusion, and thus, film processability and mechanical properties such as strength may be improved. Also, when the molecular weight is 200,000 or less, excellent film processability and productivity may be achieved owing to suitable melt viscosity of the resin.

In addition, the polylactic acid resin may have a molecular weight distribution (Mw/Mn), defined as a ratio of weight average molecular weight (Mw) to number average molecular weight (Mn), of about 1.60 to 3.0, preferably about 1.80 to 2.15. The polylactic acid resin with the molecular weight distribution within the above range has a proper melt viscosity and melting properties during a melting process such as extrusion so that it can be processed and extruded into film effectively. The film containing the polylactic acid resin exhibits good mechanical properties such as strength, etc.

Also, the polylactic acid resin may have the melting temperature (Tm) of about 145 to 178° C., preferably about 160 to 178° C., or about 165 to 175° C. When the melting temperature is 145° C. or greater, the film prepared from the polylactic acid resin may have good heat resistance. Further, when the melting temperature is 178° C. or less, the polylactic acid resin may have good film processability.

In addition, the polylactic acid resin, for example, the block copolymer contained therein, has a glass transition temperature (Tg) of about 20 to 55° C., or about 25 to 55° C., or about 30 to 55° C. The polylactic acid resin having said glass transition temperature range enables the film comprising the resin composition to have optimized flexibility and stiffness suitable as a packaging film. When the glass transition temperature of the polylactic acid resin is 20° C. or greater, the film prepared therefrom exhibits suitable stiffness, and thus, it may have good slipping property, workability, dimensional stability or anti-blocking property during a packaging process using the film. Also, when the glass transition temperature of the polylactic acid resin is 55° C. or less, the film prepared therefrom shows good flexibility and improved adhesion property for wrapping a product, and thus, it may be useful as a packaging film owing to reduced noise.

Meanwhile, the resin composition may comprise residual monomers (for example, lactide monomers used for forming the polylactic acid repeating unit) in an amount of less than about 1 wt %, preferably about 0.01 to 0.5 wt %, based on the weight of the polylactic acid resin. Since the resin composition comprises the polylactic acid resin comprising the block copolymer having a certain structural feature and the antioxidant, most of lactide monomers employed in the preparation process participate in the polymerization and form the polylactic acid repeating unit; and depolymerization or degradation of the polylactic acid resin does not actually occur. Therefore, the polylactic acid resin composition can keep the residual monomers, for example, residual lactide monomers, at a minimum level.

If the content of the residual monomers is about less than 1 wt %, an odor problem does not occur in the film forming process using the resin composition. Also, it enables the polylactic acid resin to have a suitable molecular weight, which results in the improvement of the film strength. The film can be applied for a food packaging safely.

Meanwhile, the polylactic acid resin composition may have a color-b value of less than 10, preferably 5 or less, in pellet products. Since yellowing of the polylactic acid resin can be inhibited by the antioxidant included in the resin composition, it can have a color-b value of less than 10. If the color-b value of the resin composition is less than 10, the appearance of the film prepared therefrom may be good and the product value may be improved.

Hereinafter, the preparation method of polylactic acid resin composition of the present invention will be explained in detail.

<Preparation of Polyolefin-Based Polyol Structural Unit>

First, a hydroxyl group is introduced to the terminal of a conjugated polymer (poly 1,2-butadiene or poly 1,3-butadiene) prepared by polymerization of butadiene monomers, and then a hydrogenation reaction is carried out to obtain a (co)polymer having polyolefin-based polyol structural units by forming hydroxyl-terminated polybutadiene (HTPB) with a molecular weight of 1,000 to 3,000. This process can be done by using a conventional method for preparing a polyolefin-based polyol (co)polymer.

<Preparation of Polyolefin-Based Polyol Repeating Unit A>

Then, the (co)polymer having the polyolefin-based polyol structural units, a multi-functional isocyanate compound and a urethane reaction catalyst are loaded into a reactor, heated and stirred to perform a urethane reaction. Through this reaction, more than two isocyanate groups of the isocyanate compound and the terminal hydroxyl groups of the (co)polymer are linked to form a urethane bond. As a result, a (co)polymer comprising a polyurethane polyol repeating unit, in which the polyolefin-based polyol structural units are linked in a linear or branched manner via a urethane bond, can be formed. This serves as a soft segment in the polylactic acid resin. The polyurethane polyol (co)polymer may have the polyolefin-based polyol repeating units at both terminal ends in a form of O-U-O-U-O or O-U(O)-O-U-O in which the polyolefin-based polyol structural units (O) are linked in a linear or branched manner via a urethane bond (U).

<Preparation of Polyolefin-Based Polyol Repeating Unit B>

Also, the (co)polymer comprising the polyolefin-based polyol structural unit, lactic acid (D- or L-lactic acid), lactide (D- or L-lactide), and a condensation catalyst or a ring-opening polymerization catalyst are loaded into a reactor, heated and stirred to perform a polyesterification reaction or a ring-opening polymerization. Through this reaction, said lactic acid (D- or L-lactic acid) or lactide (D- or L-lactide) is bonded with the terminal hydroxyl groups of the (co)polymer to form an ester bond. As a result, a (co)polymer may be formed which comprises a polylactic acid repeating unit (L) and a polyolefin-based polyol repeating unit in which the polyolefin-based polyol structural units are linked in a linear or branched manner via the ester bond. The polyolefin-based polyol and the polylactic acid (co)polymer may have the polylactic acid repeating units at both terminal ends in a form of L-E-O-E-L in which the polyolefin-based polyol repeating unit (O) is linearly linked via ester bonds (E).

Two or more isocyanate groups of the isocyanate compound and the terminal hydroxyl groups of the (co)polymer are linked in a linear or branched manner via a urethane bond, thereby producing the polylactic acid resin, e.g, in a form of L-E-O-E-L-U-L-E-O-E-L.

The polyolefin-based polyol repeating units prepared from the butadiene may be derived from biomass, e.g., a plant resource, and thus, the polyolefin-based polyol (co)polymer may have the organic carbon content (% $C_{bio}$) of at least about 70 wt %.

The urethane reaction may be carried out in the presence of a tin catalyst, for example, stannous octoate, dibutyltin dilaurate, dioctyltin dilaurate, and the like. In addition, the urethane reaction can be carried out under the typical reaction condition for the preparation of polyurethane resin. For example, the isocyanate compound and the polyolefin-based polyol (co)polymer are subjected to a reaction at 70 to 80° C. for 1 to 5 hrs in the presence of a urethane reaction catalyst under a nitrogen atmosphere to yield a (co)polymer comprising a polyolefin polyol repeating unit.

Subsequently, the polylactic acid resin composition comprising the block copolymer (or the polylactic acid resin comprising same) and the antioxidant can be prepared by a polycondensation reaction of lactic acid (D- or L-lactic acid) or a ring-opening polymerization of lactide (D- or L-lactide) in the presence of the antioxidant and the (co)polymer comprising the polyolefin-based polyol repeating unit. That is, according to these polymerizations, the polylactic acid resin having a polylactic acid repeating unit, as a hard segment, is formed while yellowing of the resin due to the oxidation of the soft segments can be suppressed by the antioxidant. During this process, the polyurethane polyol repeating unit is bonded to at least some of the terminal groups of the polylactic acid repeating unit so as to produce a block copolymer.

Further, a prepolymer can be prepared by combining polyolefin-based polyol and lactide. Then the prepolymer may be subjected to a chain extension reaction with a diisocyanate compound to obtain the known polylactic acid-based copolymer, or to a reaction with isocyanate compounds having at least two functional groups to obtain the known branched-type block copolymer, and a resin composition comprising the copolymer may be prepared.

Meanwhile, the ring opening polymerization of lactide may be performed in the presence of a metal catalyst such as an alkaline earth metal, a rare earth metal, a transition metal, aluminum, germanium, tin, and antimony. More specifically, the metal catalyst may be in the form of carbonic acid salts, alkoxides, halides, oxides, or carbonates. Preferably, stannous octoate, titanium tetraisopropoxide, or aluminum triisopropoxide can be used as a metal catalyst.

Additionally, the formation of polylactic acid repeating unit such as the ring opening polymerization of lactide may be carried out continuously in the same reactor in which the urethane reaction took place. In other words, a polyolefin-based polyol polymer and an isocyanate compound are subjected to a urethane reaction to yield a polymer comprising a polyolefin-based polyol repeating unit, and then a monomer such as lactide, etc. and a catalyst are continuously added to the same reactor in order to obtain a polylactic acid repeating unit. As a result, the polymer comprising polyolefin-based polyol repeating unit acts as an initiator, and allows continuous production of the polylactic acid repeating unit and the polylactic acid resin comprising same in high yield and productivity. In a similar manner, a polyolefin-based polyol is subjected to a ring opening polymerization with an initiator of lactide, and then an isocyanate compound is continuously added to the same reactor to carry out a chain extension reaction so as to obtain the polylactic acid repeating unit and the polylactic acid resin comprising same in high yield and productivity.

Since the polylactic acid resin composition comprises a block copolymer (polylactic acid resin) in which specific hard segments and soft segments are combined, it can exhibit more improved flexibility while showing biodegradability of the polylactic acid resin. Also, this resin composition can minimize the bleed-out of the soft segment which is responsible for the flexibility, and can largely prevent the soft segment-induced reduction of moisture resistance, mechanical properties, heat resistance, transparency or haze property of the film.

In addition, the polylactic acid resin is prepared to have a specific glass transition temperature and, optionally, a specific melting temperature (Tm). Accordingly, a film prepared therefrom exhibits optimized flexibility and stiffness as a packaging material, and also has good melting processability, anti-blocking property and heat resistance. Thus, the polylactic acid resin and the resin composition comprising same can be preferably used as a packaging material such as a film.

Also, yellowing of the polylactic acid resin can be suppressed due to the presence of an antioxidant in the process of preparation or in use, and the resin composition comprising these components enables the production of a packaging film having superior general properties such as significantly improved flexibility and excellent mechanical property while allowing superior appearance and product quality.

In other words, the polylactic acid resin composition of the present invention comprises the polyolefin-based polyol repeating unit as a soft segment, and thus a film prepared from the polylactic acid resin composition exhibits significantly improved flexibility.

Also, the polyolefin-based polyol of the soft segment, which is non-polar as compared to the polylactic acid resin, i.e., the hard segment, can lower the moisture content of the resin, and the moisture resistance of the resin can be improved significantly.

Hereinafter, the function and effects of the present invention is described more specifically by following examples. However, these examples are provided only for illustration purposes, and the present invention is not limited thereto.

Materials used in the following Examples and Comparative Examples are given as follows:

1. Polyolefin-Based Polyol Repeating Unit and Correspondents Thereto

HTPB 1.0: hydroxyl-terminated polybutadiene (HTPB) with a molecular weight of 1,000, which is prepared by introducing a hydroxyl group to the terminal end of a conjugated polymer of butadiene monomers (poly 1,2-butadiene or poly 1,3-butadiene), followed by a hydrogenation reaction.

HTPB 2.0: hydroxyl-terminated polybutadiene (HTPB) with a molecular weight of 2,000, which is prepared by introducing a hydroxyl group to the terminal end of a conjugated polymer of butadiene monomers (poly 1,2-butadiene or poly 1,3-butadiene), followed by a hydrogenation reaction.

HTPB 3.0: hydroxyl-terminated polybutadiene (HTPB) with a molecular weight of 3,000, which is prepared by introducing a hydroxyl group to the terminal end of a conjugated polymer of butadiene monomers (poly 1,2-butadiene or poly 1,3-butadiene), followed by a hydrogenation reaction.

HTPB 5.0: hydroxyl-terminated polybutadiene (HTPB) with a molecular weight of 5,000, which is prepared by introducing a hydroxyl group to the terminal end of a conjugated polymer of butadiene monomers (poly 1,2-butadiene or poly 1,3-butadiene), followed by a hydrogenation reaction.

PEG 8.0: polyethylene glycol; a number average molecular weight of 8,000.

PBSA 11.0: aliphatic polyester polyol prepared by the polycondensation of 1,4-butanediol, succinic acid, and adipic acid; a number average molecular weight of 11,000.

2. Diisocynate Compound and Isocyanate with at Least Three Functional Groups

HDI: hexamethylenediisocyanate

TDI: 2,4- or 2,6-tolylene diisocyanate (toluene diisocyanate: TDI)

D-L75: Bayer, Desmodur L75 (trimethylol propane+3 toluene diisocyanate)

3. Lactide Monomer

L- or D-lactide: product manufactured by Purac, optical purity of 99.5% or higher, contains biomass-derived organic carbons only 4. Antioxidants, Etc.

TNPP: tris(nonylphenyl)phosphite

U626: bis(2,4-di-t-butylphenyl)pentaerythritol diphosphite

S412: tetrakis[methane-3-(laurylthio)propionate]methane

PEPQ: (1,1'-biphenyl)-4,4'-diylbisphosphonous acid tetrakis[2,4-bis(1,1-dimethylethyl)phenyl]ester I-1076: octadecyl 3-(3,5-di-tert-butyl-4-hydroxyphenyl) propionate O3: bis[3,3-bis-(4'-hydroxy-3'-tert-butyl-phenyl)butanoic acid]glycol ester Examples 1 to 6: Preparation of Polylactic Acid Resins A to F According to the ingredients and amounts shown in Table 1 below, reactants and a catalyst were loaded into an 8 L reactor equipped with a nitrogen tube, a stirrer, a catalyst inlet, an effluent condenser and a vacuum system. Dibutyltin dilaurate was used as a catalyst in an amount of 130 ppmw based on the total weight of the reactants. Under a nitrogen atmosphere, a urethane reaction was carried out at 70° C. for 2 hrs, and then 4 kg of L-(or D-)lactide was fed into the reactor, followed by flushing with nitrogen five times.

Subsequently, the reaction mixture was heated to 150° C. to completely dissolve the L-(or D-)lactide. Tin 2-ethylhexylate catalyst of 120 ppmw based on the total weight of the reactants was diluted with 500 mL of toluene, and the diluted solution was fed into the reactor through the catalyst inlet. Under a nitrogen pressure of 1 kg, the reaction was carried out at 185° C. for 2 hrs, and then phosphoric acid was added to the reaction mixture in an amount of 200 ppmw through the catalyst inlet and admixed therewith for 15 minutes to deactivate the catalyst. After the catalyst deactivation, a vacuum condition was applied to the reactor until the pressure reached 0.5 torr to remove the unreacted L-(or D-) lactide (about 5 wt % of the initially fed weight). The molecular weight, Tg, Tm, % $C_{bio}$, and the like of the obtained resin were measured and shown in Table 1.

Example 7: Preparation of Polylactic Acid Resin G

As shown in Table 1 below, 865 g of HTPB 2.0 and 3.9 kg of L-lactide, 0.1 kg of D-lactide, and 0.8 g of U626 were loaded into an 8 L reactor equipped with a nitrogen tube, a stirrer, a catalyst inlet, an effluent condenser and a vacuum system, followed by flushing with nitrogen five times. Subsequently, the reaction mixture was heated to 150° C. to completely dissolve the lactide. Tin 2-ethylhexylate catalyst of 120 ppmw based on the total weight of the reactants was diluted with 500 mL of toluene, and the diluted solution was fed into the reactor through the catalyst inlet. Under a nitrogen pressure of 1 kg, a reaction was carried out at 185° C. for 2 hrs, and then phosphoric acid was added to the reaction mixture in an amount of 200 ppmw through the catalyst inlet and admixed therewith for 15 minutes to deactivate the catalyst. After the catalyst deactivation, a vacuum condition was applied to the reactor until the pressure reached 0.5 torr to remove the unreacted L-lactide (about 5 wt % of the initially fed weight). Then, HDI and a dilution of 120 ppmw of the catalyst dibutyltin dilaurate in 500 mL of toluene, as shown in Table 1, were introduced through the catalyst inlet into the reactor. Under a nitrogen atmosphere, a polymerization reaction was carried out at 190° C. for 1 hr, and the molecular weight, Tg, Tm, % $C_{bio}$, etc. of the obtained resin were measured and shown in Table 1.

Example 8: Preparation of Polylactic Acid Resin H

A polylactic acid resin was prepared in accordance with the same procedure as in Example 7, except for using 885 g of HTPB 2.0, 3.8 kg of L-lactide, and 0.2 kg of D-lactide, as shown in Table 1 below, followed by introducing HDI, D-L75 and, as an antioxidant, 2 g of TNPP instead of U626. The molecular weight, Tg, Tm, % $C_{bio}$, etc. of the obtained resin were measured and shown in Table 1.

Comparative Example 1: Preparation of Polylactic Acid Resin I

As shown in Table 1 below, 2.4 kg of polyol PEG 8.0 and 4 kg of L-lactide were loaded into an 8 L reactor equipped with a nitrogen tube, a stirrer, a catalyst inlet, an effluent condenser and a vacuum system, followed by flushing with nitrogen five times. Subsequently, the reaction mixture was heated to 150° C. to completely dissolve L-lactide. Tin 2-ethylhexylate catalyst of 120 ppmw based on the total weight of the reactants was diluted with 500 mL of toluene, and the diluted solution was fed into the reactor through the catalyst inlet. Under a nitrogen pressure of 1 kg, a reaction was carried out at 185° C. for 2 hrs, and then phosphoric acid was added to the reaction mixture in an amount of 200 ppmw through the catalyst inlet and admixed therewith for 15 minutes to deactivate the catalyst. After the catalyst deactivation, a vacuum condition was applied to the reactor until the pressure reached 0.5 torr to remove the unreacted L-lactide. The molecular weight, Tg, Tm, % $C_{bio}$, etc. of the obtained resin were measured and shown in Table 1.

Comparative Example 2: Preparation of Polylactic Acid Resin J

A polylactic acid resin was prepared in accordance with the same procedure as in Comparative Example 1, except for using 6 g of 1-dodecanol instead of polyol PEG 8.0 as shown in Table 1 below. The molecular weight, Tg, Tm, % $C_{bio}$, etc. of the obtained resin were measured and shown in Table 1.

Comparative Example 3: Preparation of Polylactic Acid Resin K

As shown in Table 1 below, PBSA 11.0 polyol (polyester polyol) and HDI were loaded into an 8 L reactor equipped with a nitrogen tube, a stirrer, a catalyst inlet, an effluent condenser and a vacuum system, followed by flushing with nitrogen five times. Dibutyltin dilaurate was used as a catalyst in an amount of 130 ppmw based on the total weight of the reactants. Under a nitrogen atmosphere, a urethane reaction was carried out at 190° C. for 2 hrs, and then 4 kg of L-lactide was fed into the reactor, and completely dissolved at 190° C. in a nitrogen atmosphere. Tin 2-ethylhexylate as an addition polymerization catalyst and dibutyltin dilaurate as an ester and/or ester amide exchange catalyst in amounts of 120 ppmw and 1,000 ppmw, respectively, based on the total weight of the reactants, were diluted with 500 mL of toluene. The diluted solution was fed into the reactor through the catalyst inlet. Under a nitrogen pressure of 1 kg, the reaction was carried out at 190° C. for 2 hrs, and then phosphoric acid was added to the reaction mixture in an amount of 200 ppmw through the catalyst inlet and admixed therewith for 15 minutes to deactivate the catalyst. After the catalyst deactivation, a vacuum condition was applied to the reactor until the pressure reached 0.5 torr to remove the unreacted L-lactide (about 5 wt % of the initially fed weight). The molecular weight, Tg, Tm, % $C_{bio}$, etc. of the obtained resin were measured and shown in Table 1.

Experimental Example (1) NCO/OH: molar ratio of "isocyanate group of diisocyanate compound (e.g., hexamethylene diisocyanate)/terminal hydroxyl group of polyether-based polyol repeating unit (or (co)polymer)" for a reaction to form polyolefin-based polyol repeating units.

(2) OHV (KOH mg/g): measured by dissolving the polyolefin-based polyol repeating unit (or (co)polymer) in dichloromethane, acetylating the repeating unit, hydrolyzing the acetylated repeating unit to generate acetic acid, and titrating the acetic acid with 0.1 N KOH in methanol. It corresponds to the number of terminal hydroxyl groups of the polyolefin-based polyol repeating units (or (co)polymer).

(3) Mw and Mn (g/mol) and molecular weight distribution (Mw/Mn): measured by applying a 0.25 wt % solution of polylactic acid resin in chloroform to gel permeation chromatography (manufactured by Viscotek TDA 305, Column: Shodex LF804*2 ea). Polystyrene was used as a standard material to determine weight average molecular weight (Mw) and number average molecular weight (Mn). A molecular weight distribution was calculated from Mw and Mn.

(4) Tg (glass transition temperature, ° C.): measured with a differential scanning calorimeter (manufactured by TA Instruments) while quenching the melted sample and then increasing the temperature of the sample at a rate of 10° C./min. Tg was determined from the mid value of tangential line of an endothermic curve and a base line.

(5) Tm (melting temperature, ° C.): measured with a differential scanning calorimeter (manufactured by TA Instruments) while quenching the melted sample and then elevating the temperature of the sample at a rate of 10° C./min. Tm was determined from the maximum value of the melting endothermic peak of the crystal.

(6) Residual monomer (lactide) content (wt %): measured by dissolving 0.1 g of the resin in 4 mL of chloroform, adding 10 mL of hexane thereto, and filtering the resulting mixture, followed by a GC analysis.

(7) Content of polyolefin-based polyol repeating unit (wt %): the content of polyolefin-based polyol repeating units in prepared polylactic acid resin was measured using a 600 MHz nuclear magnetic resonance (NMR) spectrometer.

(8) Chip color-b: color-b value of the resin chip was measured by using Chroma meter CR-410 manufactured by Konica Minolta Sensing Co., and was expressed as a mean value of five measurements.

(9) Organic carbon content of biomass-based carbon (% $C_{bio}$): test for measuring biomass-based material content by using the amount of organic radiocarbon (percent modern; $^{14}C$), based on ASTM D6866; the organic carbon content of biomass-based carbon was measured.

TABLE 1

| | Resin A | Resin B | Resin C | Resin D | Resin E | Resin F | Resin G | Resin H | Resin I | Resin J | Resin K |
|---|---|---|---|---|---|---|---|---|---|---|---|
| HTPB 2.0 (g) | | 475 | | | 104 | | 865 | 885 | | | |
| HTPB 1.0 (g) | | | 231 | 208 | | | | | | | |
| HTPB 3.0 (g) | 490 | | | | | | | | | | |
| HTPB 5.0 (g) | | | | | | 1607 | | | | | |
| PEG 8.0 (g) | | | | | | | | | 2400 | | |
| PBSA 11.0 (g) | | | | | | | | | | | 800 |
| 1-dodecanol (g) | | | | | | | | | | 6 | |

TABLE 1-continued

| | Resin A | Resin B | Resin C | Resin D | Resin E | Resin F | Resin G | Resin H | Resin I | Resin J | Resin K |
|---|---|---|---|---|---|---|---|---|---|---|---|
| HDI (g) | 17 | 32 | | 19 | 2 | 122 | 55 | 3 | | | 9.5 |
| TDI (g) | | | 36 | | | | | | | | |
| D-L75 (g) | | | | | | | | 3 | | | |
| NCO/OH | 0.65 | 0.85 | 0.92 | 0.55 | 0.5 | 0.96 | 0.8 | | | | 0.8 |
| OHV (KOH mg/g) | 9 | 6 | 7 | 29 | 7 | 2 | 4 | 4 | 47 | | 3 |
| TNPP (g) | | | 4 | | | | | 2 | | | |
| U626 (g) | 2 | 3 | | | 6 | 9.6 | 0.8 | | | 3 | |
| PEPQ (g) | | | | 4 | | | | | | | |
| S412 (g) | | | | 2 | | | | | | | |
| I-1076 (g) | | 1 | | | | | | | | | |
| O3 (g) | 2 | | | | | | | | | | |
| L-lactide (g) | 4000 | | 4000 | | 4000 | 4000 | 3900 | 3800 | 4000 | 4000 | 4000 |
| D-lactide (g) | | 4000 | | 4000 | | | 100 | 200 | | | |
| Antioxidant (ppmw) | 1000 | 1000 | 1000 | 1500 | 1500 | 2400 | 200 | 500 | 0 | 750 | 0 |
| IV (dl/g) | 0.95 | 1.38 | 1.5 | 0.66 | 0.9 | 1.25 | | | 0.2 | 1.55 | |
| Mn (×1,000, g/mol) | 75 | 120 | 145 | 62 | 70 | 61 | 129 | 121 | 14 | 128 | 65 |
| Mw (×1,000, g/mol) | 165 | 240 | 320 | 108 | 152 | 110 | 280 | 340 | 26 | 295 | 185 |
| MWD | 2.2 | 2.0 | 2.2 | 1.7 | 2.2 | 1.8 | 2.2 | 2.7 | 1.9 | 2.3 | 2.8 |
| Tg (° C.) | 50 | 49 | 54 | 55 | 46 | 30 | 40 | 42 | 15 | 65 | 18 |
| Tm (° C.) | 171 | 168 | 174 | 174 | 164 | 145 | 155 | 153 | 130 | 176 | 85, 165 |
| Color b | 3 | 2 | 2 | 3 | 5 | 8 | 8 | 7 | 5 | 4 | 13 |
| Polyolefin-based polyol repeating unit (wt %) | 11% | 11% | 6% | 5% | 15% | 30% | 19% | 18% | 39% | 0% | 18% |
| Residual monomer (wt %) | 0.45 | 0.4 | 0.3 | 0.65 | 0.55 | 0.78 | 0.92 | 0.88 | 8 | 0.3 | 2.5 |
| Biomass C (wt %, ASTM D6866) | 88% | 90% | 92% | 94% | 85% | 69% | 79% | 81% | 57% | 97% | 78% |

As shown in Table 1, Resins A to H according to Examples 1 to 8 were polylactic acid resins (block copolymers): which were prepared by subjecting polyolefin-based polyol having a molecular weight of 1,000 to 5,000 to a urethane reaction with 1,6-hexamethylene diisocyanate or 2,4-toluene diisocyanate at a molar ratio of NCO/OHV of 0.5 to 0.99 to yield a polyolefin-based polyol repeating unit (or (co)polymer) in which polyolefin-based polyol structural units, such as the hydroxyl-terminated polybutadiene, were linearly linked, and using the same compound as a soft segment and as an initiator for polymerization; or by subjecting polyolefin-based polyol having a molecular weight of 1,000 to 5,000 to an addition polymerization with lactide to yield polyolefin-based polyol and polylactic acid resin copolymer prepolymer, and then subjecting the same compound to a urethane reaction with 1,6-hexamethylene diisocyanate or D-L75 compound for a chain extension.

The polylactic acid resin compositions of Examples 1 to 8 were polymerized in the presence of an antioxidant, and it could be seen that the resins exhibited low color-b value due to suppressed yellowing, and the residual monomer content was low. Also, these resins used monomers including organic carbon of biomass-based carbon according to the ASTM D6866 standard, thus having % $C_{bio}$ of at least about 60 wt %.

In the polylactic acid resins, the polyolefin-based polyol repeating unit (or (co)polymer) or the polyolefin-based polyol and the polylactic acid resin copolymer were found to have an OHV of 2 to 30, so that they could act as an initiator for the polymerization of polylactic acid repeating unit.

In addition, the final polylactic acid Resins A to H had a weight average molecular weight of 100,000 to 400,000, a molecular weight distribution of 1.80 to 3.0, Tg of 20 to 55° C., and Tm of 145 to 178° C. Thus, these resins can be prepared into chips, and they alone can have a suitable melting viscosity at a film extrusion temperature of at least 200° C. Moreover, it was observed that yellowing rarely occurred owing to low residual lactide content in the resins, which is less than 1 wt %, resulting in low color-b value of less than 10.

In contrast, Resin I according to Comparative Example 1 is a polylactic acid resin prepared by using polyethylene glycol of a molecular weight of 8,000 as an initiator for the ring-opening polymerization of L-lactide, without going through a urethane reaction. In this case, however, the OHV of the initiator was too high to obtain a polylactic acid resin with a desired weight average molecular weight. Further, it was confirmed that Resin I included an excessive amount of residual lactide, and had low polymerization conversion and a very low melting viscosity at a temperature of 200° C. or more. Also, Resin I had % $C_{bio}$ of less than 60 wt %.

Resin J according to Comparative Example 2 is a polylactic acid resin prepared by a ring opening polymerization of L-lactide using a small amount of 1-dodecanol as an initiator according to a conventional preparation method of a polylactic acid resin, without introducing a soft segment (polyolefin-based polyol repeating unit). This resin was found to have a very broad molecular weight distribution of 2.30.

Lastly, Resin K according to Comparative Example 3 is a polylactic copolymer which was prepared by employing a polyurethane formed from a polyester polyol repeating unit, such as PBSA, instead of polyolefin-based polyol repeating unit, as a soft segment while copolymerizing the polyurethane with lactide in the presence of a ring opening polymerization catalyst, an ester exchange catalyst, and/or an ester amide exchange catalyst. In this polylactic acid-based copolymer, the polyurethane was randomly introduced in small segment sizes and copolymzerized with the polylactic acid repeating unit during the ester and/or ester amide exchange reaction. Resin K had a wide molecular weight distribution, 2.85, and its Tm was relatively low. Moreover, Resin K did not contain an antioxidant. Thus, it was confirmed that the residual lactide content was relatively high and the color-b value was considerably high.

What is claimed is:

1. A polylactic acid resin composition comprising:
   a polylactic acid resin comprising a hard segment comprising a polylactic acid repeating unit of Formula 1 and a soft segment comprising a polyolefin-based polyol repeating unit in which polyolefin-based polyol structural units of Formula 2 are linked in a linear or branched manner via a urethane bond, wherein the organic carbon content (% $C_{bio}$) of biomass-based carbon, as defined in Equation 1, is at least 60 wt %, wherein, in Formulae 1 and 2, n is an integer from 700 to 5,000, and m+1 is an integer from 5 to 200; and an antioxidant:

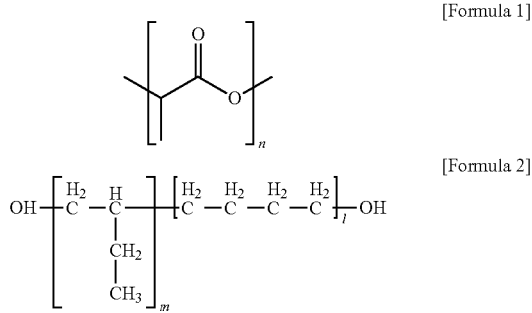

[Formula 1]

[Formula 2]

% $C_{bio}$=(weight ratio of $^{14}C$ isotope to $^{12}C$ of the total carbon content in the polylactic acid resin)/(weight ratio of $^{14}C$ isotope to $^{12}C$ of the total carbon content in a biomass-based carbon standard material), wherein the antioxidant is used in an amount of 100 to 3,000 ppmw based on the amount of the monomers for forming the polylactic acid repeating unit, and [Equation 1]

wherein the polylactic acid resin is prepared by reacting an isocyanate containing compound with polyolefin-based polyol structural units of Formula 2 to form the soft segments, and then reacting the soft segments with the polylactic acid repeating units of Formula 1.

2. The polylactic acid resin composition of claim 1, wherein the $^{14}C$ isotope content based on the total weight of carbon in the polylactic acid resin is $7.2\times10^{-11}$ to $1.2\times10^{-10}$ wt %.

3. The polylactic acid resin composition of claim 1, wherein the soft segment has the organic carbon content (% $C_{bio}$) of biomass-based carbon, as defined in Equation 1, of at least 70 wt %.

4. The polylactic acid resin composition of claim 1, wherein the polylactic acid resin has a number average molecular weight of 50,000 to 200,000, and a weight average molecular weight of 100,000 to 400,000.

5. The polylactic acid resin composition of claim 1, wherein the polylactic acid resin has a glass transition temperature (Tg) of 20 to 55° C., and a melting temperature (Tm) of 145 to 178° C.

6. The polylactic acid resin composition of claim 1, wherein the urethane bond is formed by a reaction between the terminal hydroxyl group of the polyolefin-based polyol structural unit; and diisocyanate or di- or higher functional isocyanate compound.

7. The polylactic acid resin composition of claim 1, wherein the polylactic acid resin comprises a block copolymer in which the terminal carboxyl group of the polylactic acid repeating units contained in the hard segment is linked to the terminal hydroxyl group of the polyolefin-based polyol structural units contained in the soft segment via an ester bond.

8. The polylactic acid resin composition of claim 7, wherein the polylactic acid resin further comprises a polylactic acid homopolymer which is remaining uncoupled with the polyolefin-based polyol repeating unit.

9. The polylactic acid resin composition of claim 1, wherein the polymer of the polyolefin-based polyol repeating unit has a number average molecular weight of 1,000 to 100,000.

10. The polylactic acid resin composition of claim 6, wherein the molar ratio of the terminal hydroxyl group of the polyolefin-based polyol structural unit to the isocyanate group of diisocyanate or di- or higher functional isocyanate compound is 1:0.50 to 1:0.99.

11. The polylactic acid resin composition of claim 1, wherein the polylactic acid resin comprises the hard segment in an amount of 65 to 95 parts by weight and the soft segment in an amount of 5 to 35 parts by weight per 100 parts by weight of the total polylactic acid resin.

12. The polylactic acid resin composition of claim 1, which has a color-b value of less than 10.

13. The polylactic acid resin composition of claim 1, which comprises residual monomers in an amount of less than 1 wt % based on the total weight of polylactic acid resin.

14. The polylactic acid resin composition of claim 1, wherein the antioxidant comprises at least one antioxidant selected from the group consisting of a hindered phenol-based antioxidant, an amine-based antioxidant, a thio-based antioxidant, and a phosphite-based antioxidant.

* * * * *